(12) United States Patent
Park

(10) Patent No.: US 12,494,542 B2
(45) Date of Patent: Dec. 9, 2025

(54) BATTERY MODULE CONFIGURED TO BE EASILY ASSEMBLED AND BATTERY PACK INCLUDING THE SAME

(71) Applicant: LG Energy Solution, Ltd., Seoul (KR)

(72) Inventor: Yoon Woo Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 653 days.

(21) Appl. No.: 17/800,763

(22) PCT Filed: Nov. 26, 2020

(86) PCT No.: PCT/KR2020/016901
§ 371 (c)(1),
(2) Date: Aug. 18, 2022

(87) PCT Pub. No.: WO2021/182715
PCT Pub. Date: Sep. 16, 2021

(65) Prior Publication Data
US 2023/0104566 A1  Apr. 6, 2023

(30) Foreign Application Priority Data

Mar. 12, 2020 (KR) .................. 10-2020-0030580

(51) Int. Cl.
*H01M 50/262* (2021.01)
*H01M 50/204* (2021.01)
*H01M 50/291* (2021.01)

(52) U.S. Cl.
CPC ....... *H01M 50/262* (2021.01); *H01M 50/204* (2021.01); *H01M 50/291* (2021.01)

(58) Field of Classification Search
None
See application file for complete search history.

(56) References Cited

U.S. PATENT DOCUMENTS

| | | |
|---|---|---|
| 2010/0266883 A1 | 10/2010 | Koetting et al. |
| 2011/0256446 A1 | 10/2011 | Bronczyk et al. |
| 2012/0040221 A1 | 2/2012 | Stoughton et al. |
| 2013/0164578 A1 | 6/2013 | Sweet et al. |
| 2013/0177797 A1 | 7/2013 | Bronczyk et al. |
| 2013/0207459 A1 | 8/2013 | Schroder et al. |

(Continued)

FOREIGN PATENT DOCUMENTS

| | | |
|---|---|---|
| CN | 102687310 A | 9/2012 |
| CN | 107112461 A | 8/2017 |

(Continued)

OTHER PUBLICATIONS

Machine translation of KR20140147555 (Year: 2014).*

(Continued)

*Primary Examiner* — Wyatt P McConnell
(74) *Attorney, Agent, or Firm* — Lerner David LLP

(57) ABSTRACT

The present invention relates to a battery module configured to be easily assembled and a battery pack including the same, and more particularly to a battery module including a plurality of battery cells and a pair of cell cartridges configured to receive the battery cells, the pair of cell cartridges being located adjacent to each other, wherein the pair of cell cartridges is identical in external shape and size to each other, and a battery pack including the same.

16 Claims, 11 Drawing Sheets

(56) References Cited

U.S. PATENT DOCUMENTS

| | | | |
|---|---|---|---|
| 2014/0147709 A1* | 5/2014 | Ketkar | F25B 1/00 429/50 |
| 2015/0380690 A1 | 12/2015 | Nam et al. | |
| 2016/0141712 A1 | 5/2016 | Choi et al. | |
| 2016/0172646 A1 | 6/2016 | Yamafuku et al. | |
| 2016/0211492 A1 | 7/2016 | Cho | |
| 2016/0268658 A1 | 9/2016 | Kong et al. | |
| 2017/0104194 A1 | 4/2017 | Blumka et al. | |
| 2017/0194681 A1 | 7/2017 | Kim et al. | |
| 2017/0309869 A1 | 10/2017 | Kim et al. | |
| 2017/0309876 A1 | 10/2017 | An et al. | |
| 2018/0205045 A1 | 7/2018 | Schröder et al. | |
| 2018/0366698 A1* | 12/2018 | An | H01M 50/204 |
| 2019/0148799 A1 | 5/2019 | Lim et al. | |
| 2019/0267587 A1 | 8/2019 | Myung et al. | |
| 2020/0266402 A1 | 8/2020 | Myung et al. | |

FOREIGN PATENT DOCUMENTS

| | | |
|---|---|---|
| CN | 207199690 U | 4/2018 |
| CN | 207250600 U | 4/2018 |
| CN | 108370010 A | 8/2018 |
| CN | 208062122 U | 11/2018 |
| CN | 208127284 U | 11/2018 |
| CN | 208622800 U | 3/2019 |
| CN | 109891623 A | 6/2019 |
| EP | 3514853 A1 | 7/2019 |
| JP | 2015505142 A | 2/2015 |
| JP | 2016115486 A | 6/2016 |
| JP | 2016541095 A | 12/2016 |
| JP | 2017-513192 A | 5/2017 |
| JP | 2018-506840 A | 3/2018 |
| JP | 2018-163847 A | 10/2018 |
| KR | 20140147555 * | 12/2014 |
| KR | 20160012021 A | 2/2016 |
| KR | 2016-0087252 A | 7/2016 |
| KR | 2017-0043313 A | 4/2017 |
| KR | 20170065864 A | 6/2017 |
| KR | 101810657 B1 | 12/2017 |
| KR | 101833526 B1 | 2/2018 |
| KR | 20180024965 A | 3/2018 |
| KR | 20180031203 A | 3/2018 |
| KR | 2018-0063454 A | 6/2018 |
| KR | 20190010193 A | 1/2019 |
| KR | 102053965 B1 | 12/2019 |
| WO | 2012044065 A2 | 4/2012 |
| WO | 2020-004764 A1 | 1/2020 |

OTHER PUBLICATIONS

Extended European Search Report including Written Opinion for Application No. 20924772.5 dated Feb. 15, 2024, pp. 1-15.
International Search Report for PCT/KR2020/016901 dated Mar. 3, 2021. 3 pgs.
Search Report dated Apr. 8, 2024 from the Office Action for Chinese Application No. 202080092765.6 issued Apr. 10, 2024, 3 pages.
Supplementary Partial European Search Report including Written Opinion for Application No. 20924772.5 dated Dec. 12, 2023, pp. 1-12.

* cited by examiner

[FIG. 1]
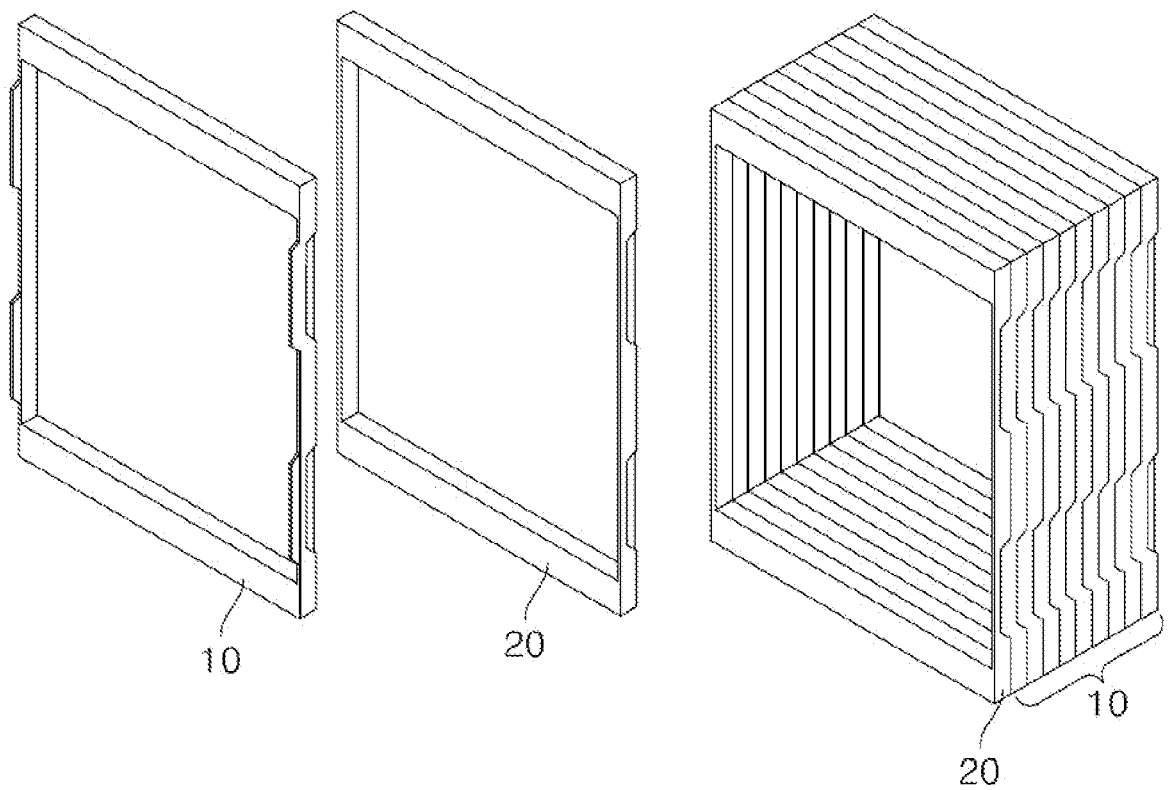

[FIG. 2]
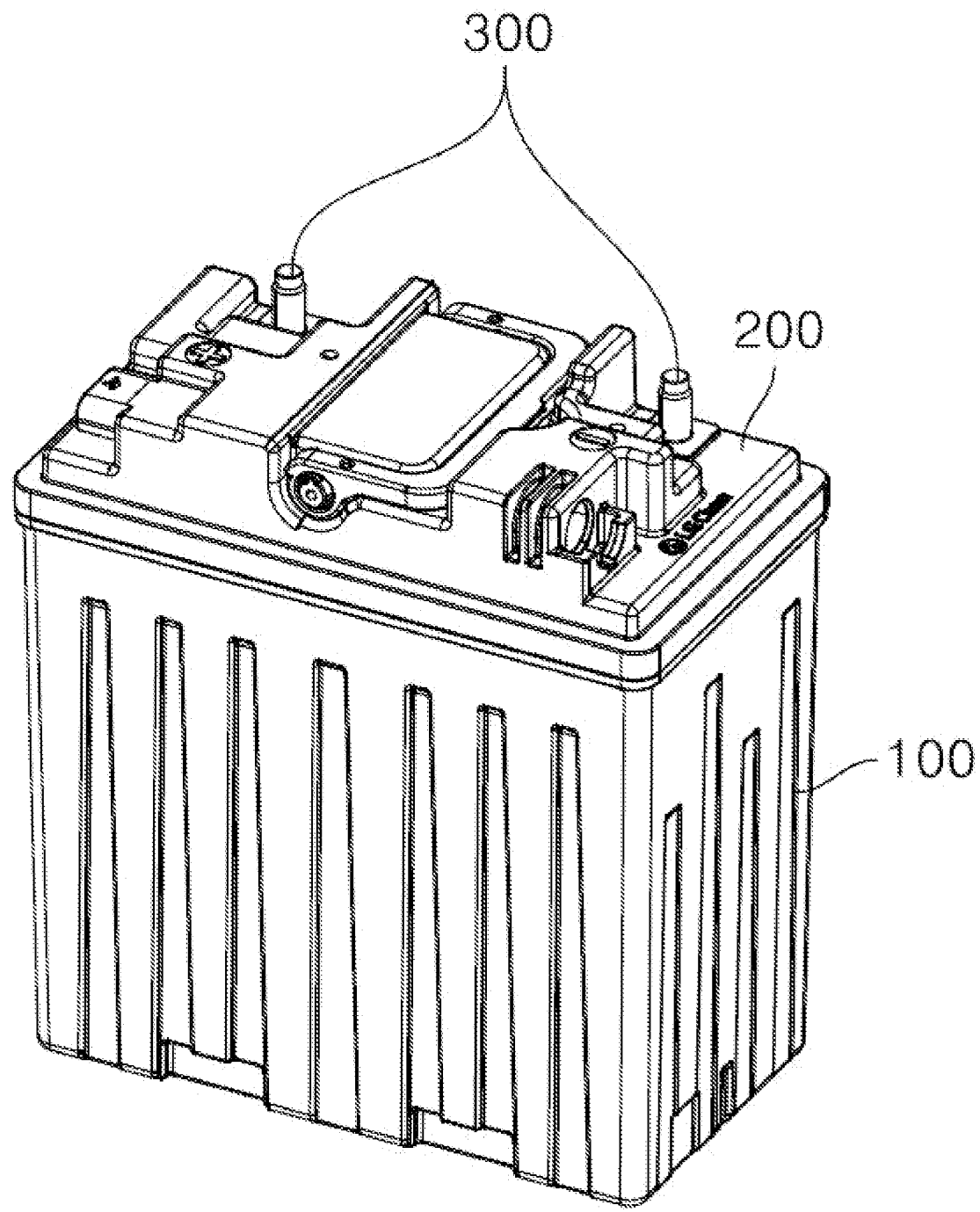

[FIG. 3]
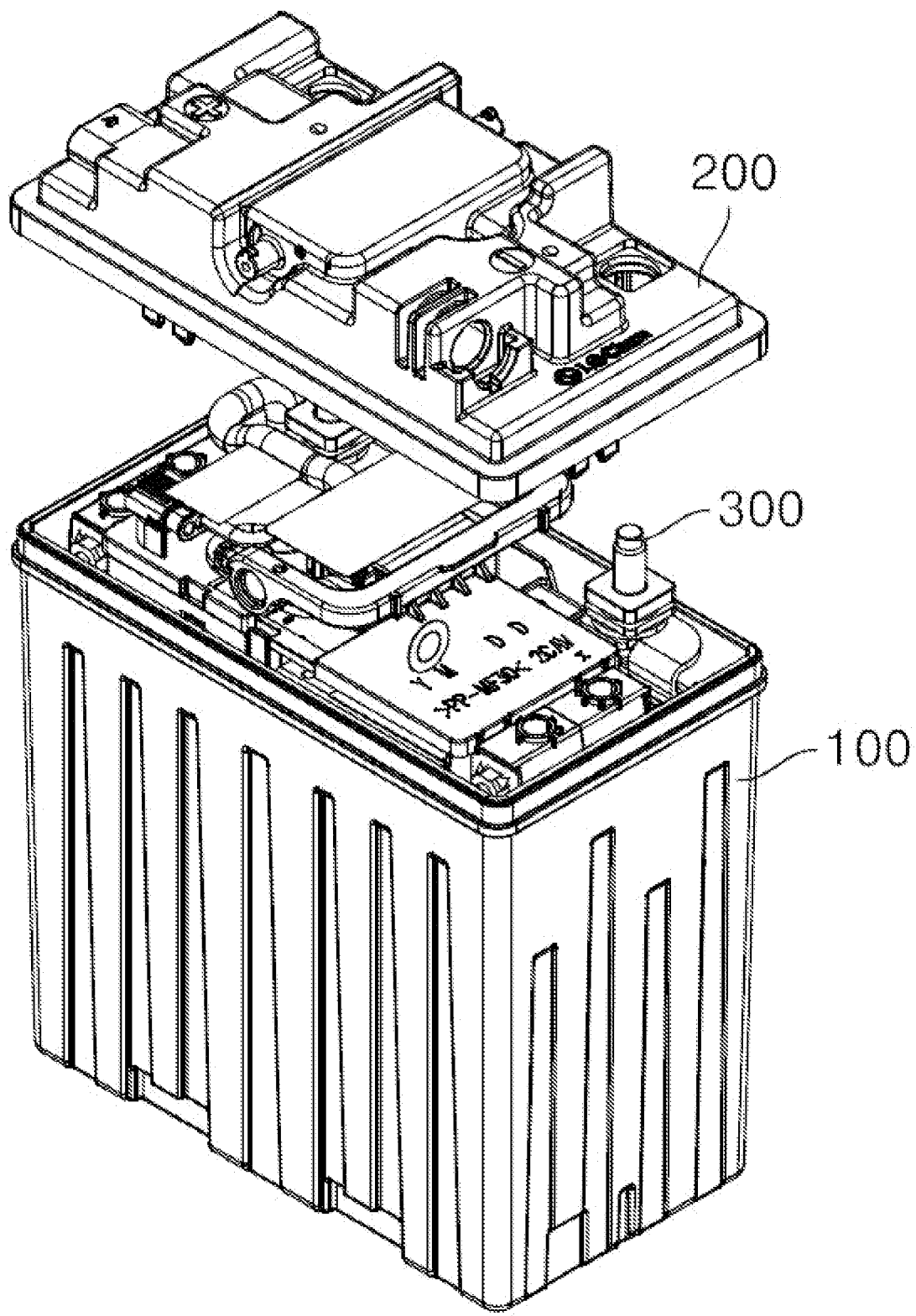

[FIG. 4]
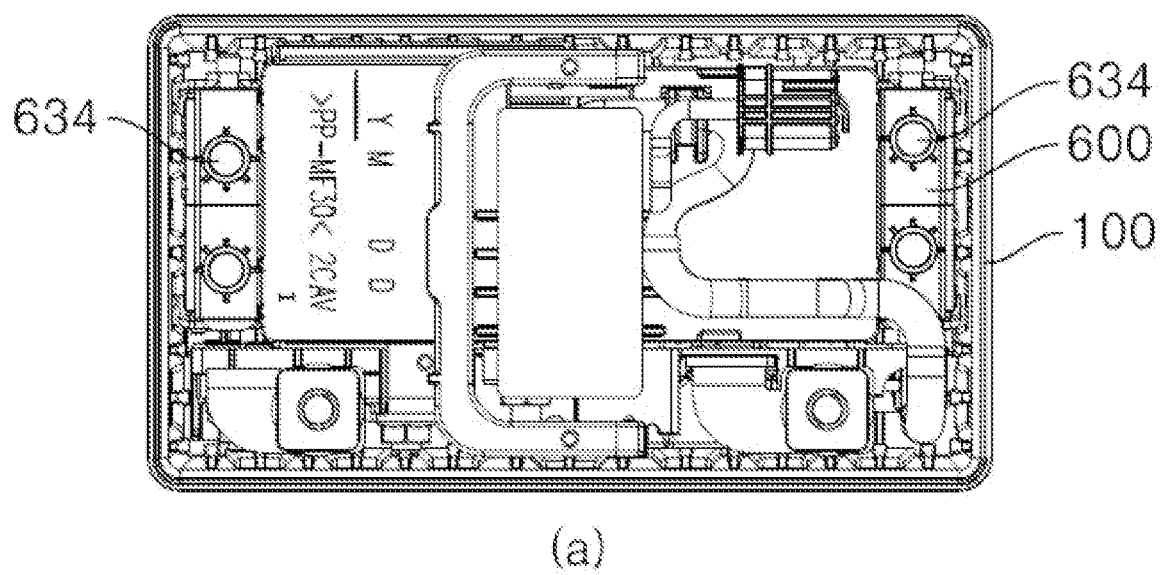
(a)
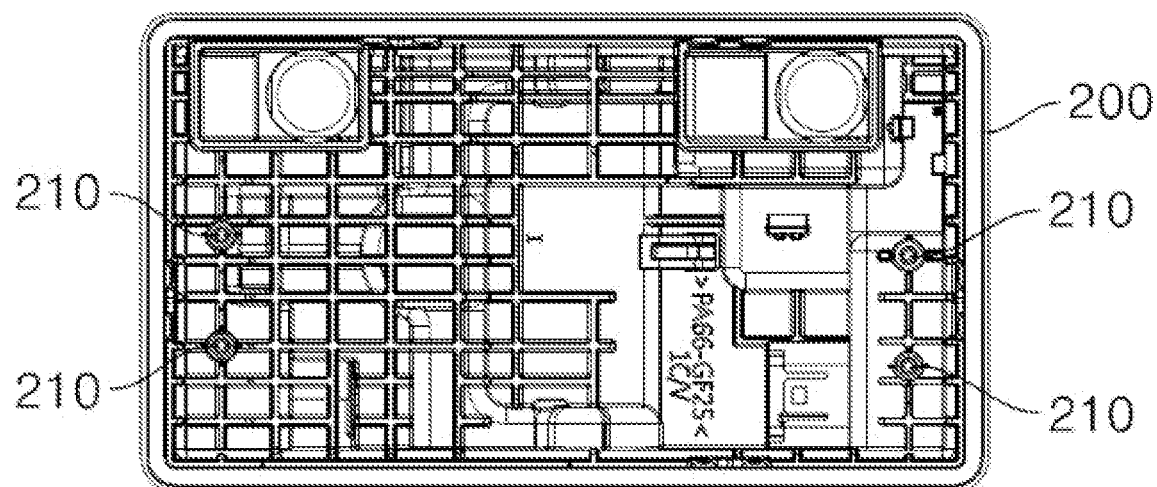
(b)

[FIG. 5]
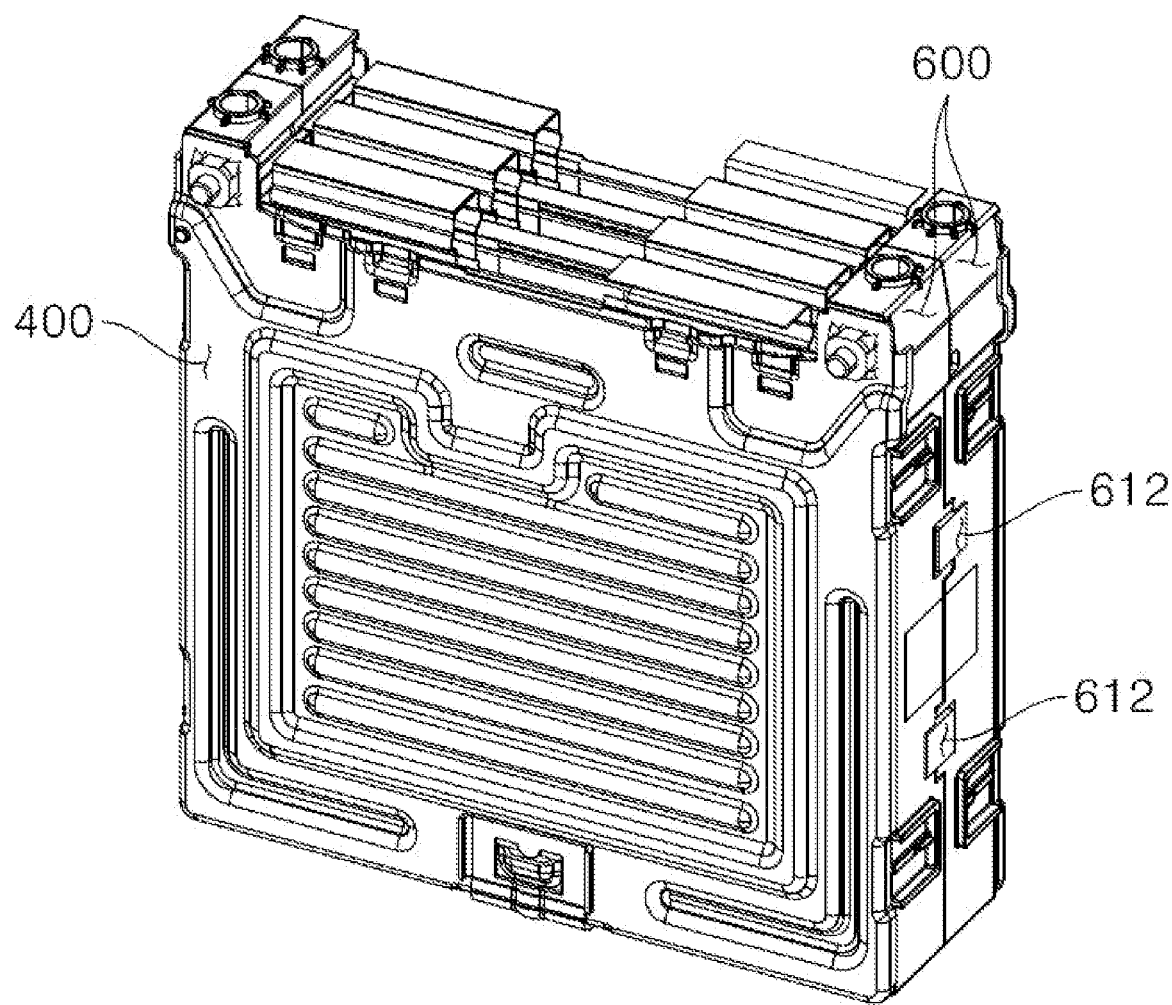

【FIG. 6】
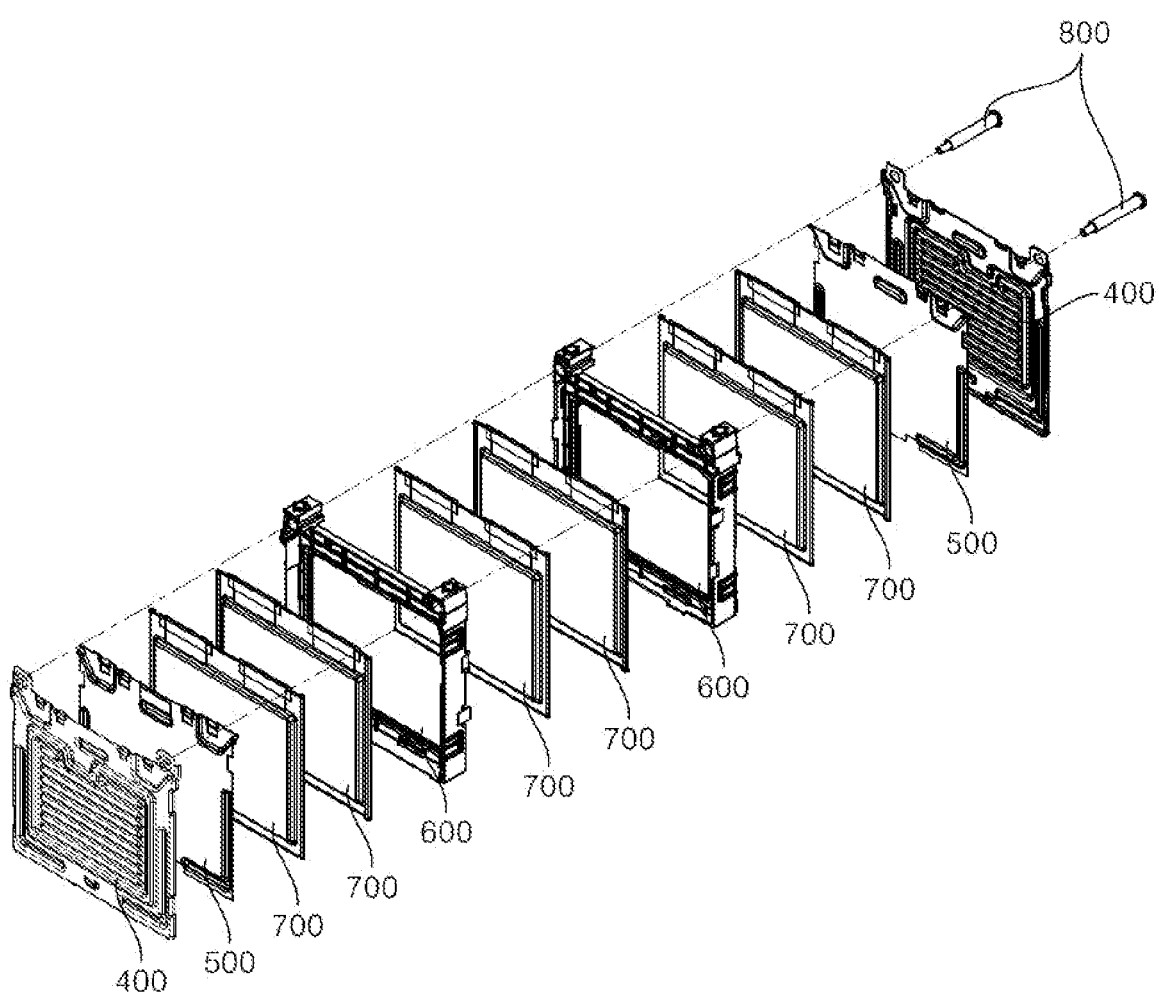

[FIG. 7]
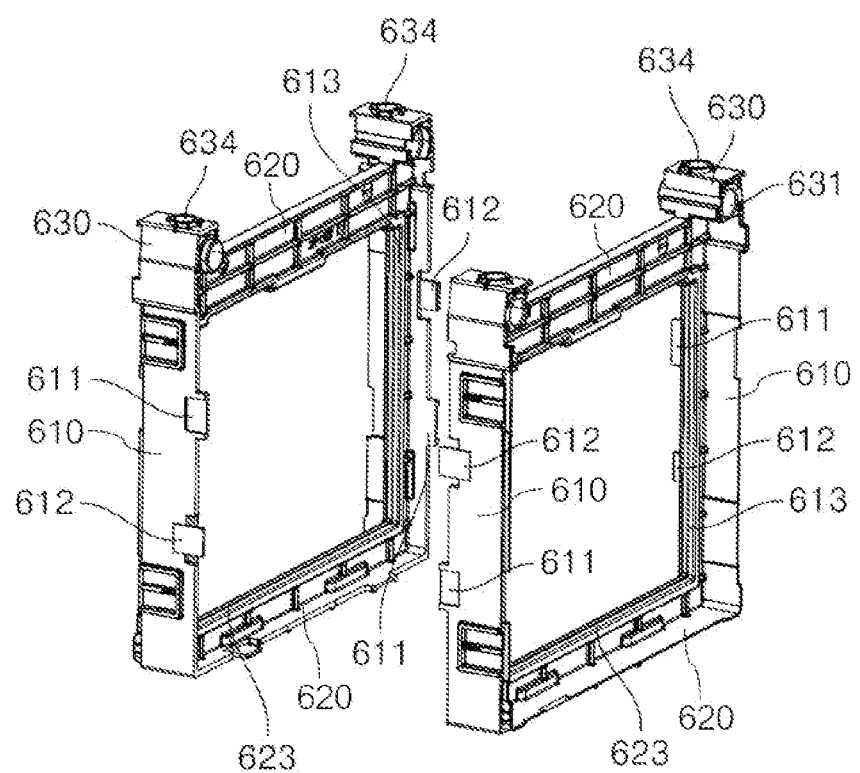

[FIG. 8]
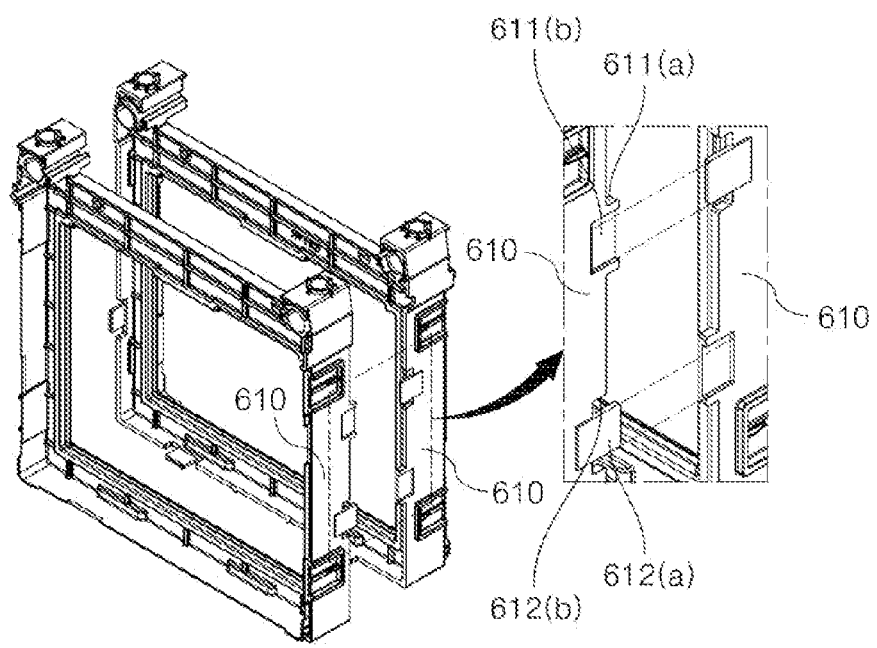

[FIG. 9]
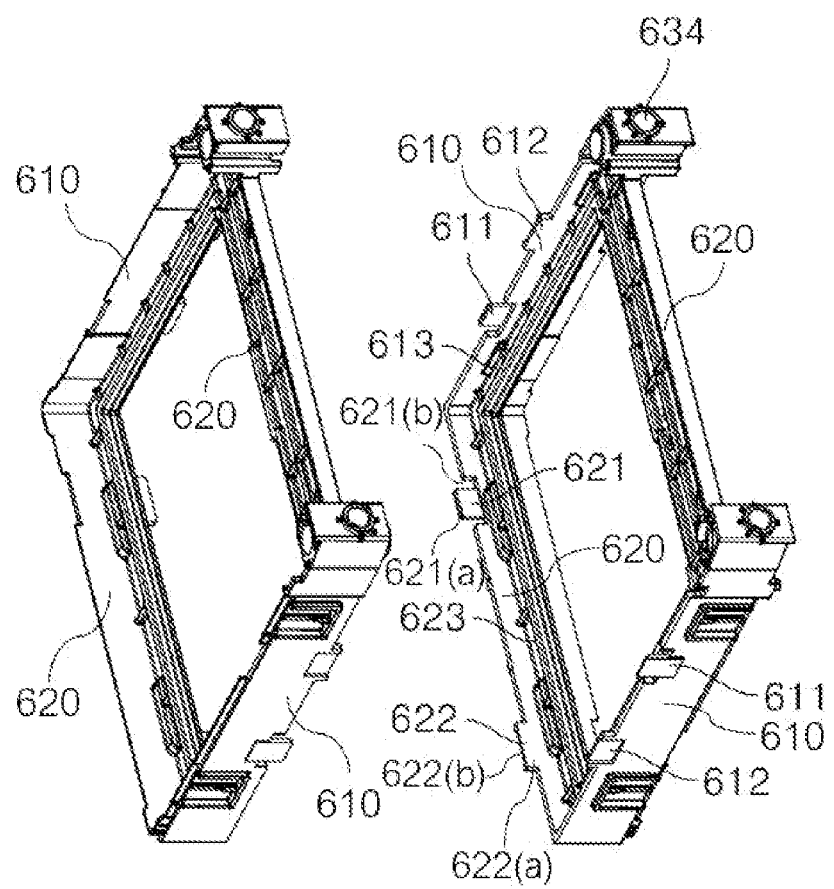

【FIG. 10】
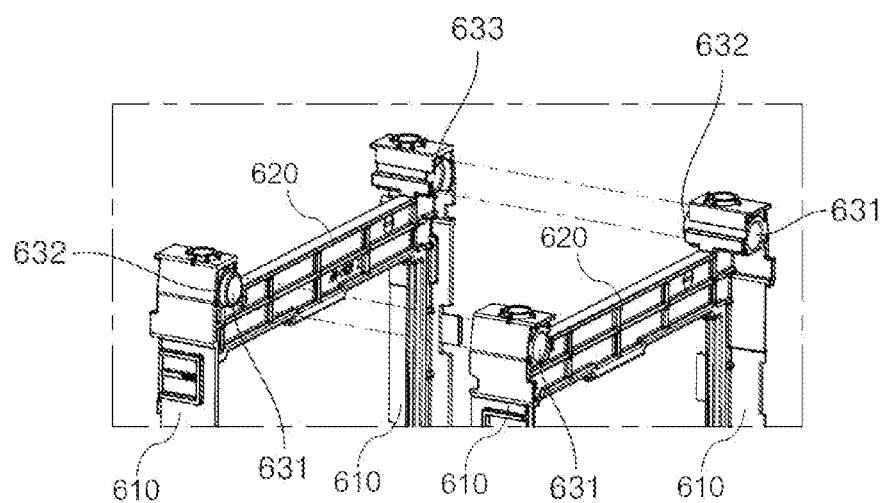

[FIG. 11]
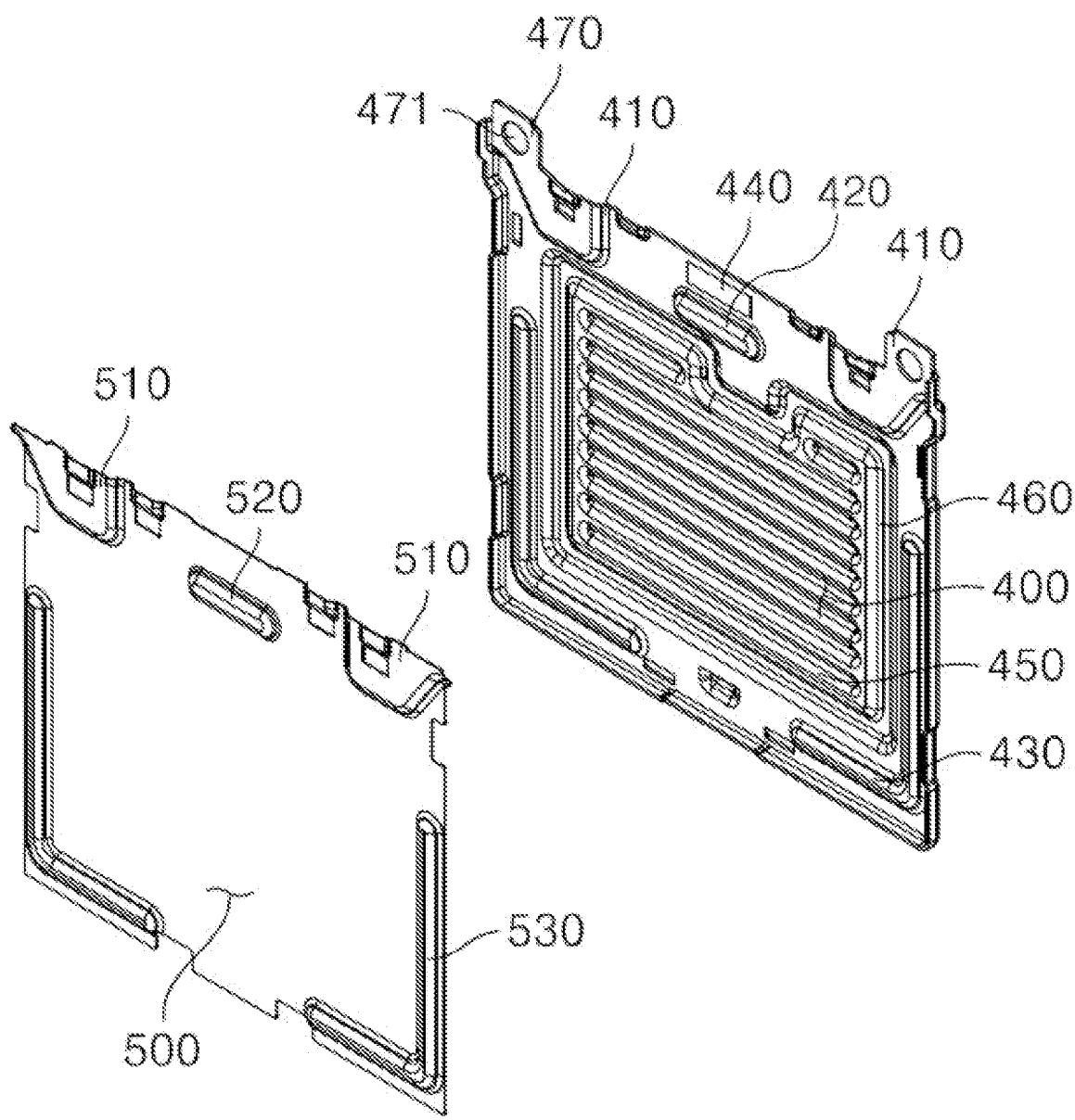

BATTERY MODULE CONFIGURED TO BE EASILY ASSEMBLED AND BATTERY PACK INCLUDING THE SAME

CROSS-REFERENCE TO RELATED APPLICATIONS

This application is a national stage entry under 35 U.S.C. § 371 of International Application No. PCT/KR2020/016901, filed on Nov. 26, 2020, which claims priority to Korean Patent Application No. 10-2020-0030580 filed on Mar. 12, 2020, the disclosures of which are incorporated herein by reference in their entireties.

This application claims the benefit of priority to Korean Patent Application No. 2020-0030580 filed on Mar. 12, 2020, the disclosure of which is incorporated herein by reference in its entirety.

TECHNICAL FIELD

The present invention relates to a battery module configured to be easily assembled and a battery pack including the same, and more particularly to a battery module using the same kinds of cell cartridges having coupling members configured to increase the force of coupling between upper ends and side surfaces of the cell cartridges when a plurality of battery cells is received, the cell cartridges being identical in external shape and size to each other, and a battery pack including the same.

BACKGROUND ART

With recent development of alternative energies due to air pollution and energy depletion caused as the result of use of fossil fuels, demand for secondary batteries capable of storing electrical energy that is produced has increased. The secondary batteries, which are being capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other is used in a vehicle.

In the battery module, a plurality of secondary batteries, i.e. battery cells, is connected to each other in series or in parallel in order to increase capacity and output of the battery module. The battery cells are received in cell cartridges and are then fixed, whereby e movement of the battery cells is prevented.

FIG. 1 is a perspective view showing stacking of conventional cell cartridges. As shown in FIG. 1, the conventional cell cartridges include a first cartridge 10 and a second cartridge 20 having different external shapes. That is, for the conventional cell cartridges, a plurality of first cartridges 10 is stacked and then a second cartridge 20 is stacked on one of the outermost sides of the first cartridges 10 in order to form a single cartridge stack.

As an example, four protrusions are formed on one side surface of each of the first cartridges 10 and four recesses are formed in the other side surface of the first cartridge, and the second cartridge 20 is coupled to one side surface of the first cartridge 10, on which the protrusions are formed. To this end, only four recesses are formed in the other side surface of the second cartridge 20.

In the case in which various kinds of cell cartridges are used, as described above, production costs are increased and a cartridge stack assembly process is complicated. Of course, cell cartridges of one kind having no protrusions formed on the outer surface thereof may be used. In this case, however, the cartridges are merely arranged, whereby the force of coupling therebetween is low.

In Korean Patent Application Publication No. 2019-0010193, mirror image type fastening hooks are used to increase the force of coupling between cartridges. However, two kinds of cell cartridges are still used, whereby shortcoming at the time of production and assembly of the cartridges is not overcome.

Meanwhile, the battery module is received in a housing configured to have a predetermined shape to constitute a battery pack. At this time, the battery module must be securely fixed such that the battery module does not move in the housing.

PRIOR ART DOCUMENT (Patent Document 1) Korean Patent Application Publication No. 2019-0010193

DISCLOSURE

Technical Problem

The present invention has been made in view of the above problems, and it is an object of the present invention to provide a battery module configured such that only cell cartridges of one kind are used at the time of assembly of the battery module, whereby processes from a cartridge manufacturing step to formation of the battery module are simplified, and a battery pack including the same.

It is another object of the present invention to provide a battery module configured such that the force of coupling between cell cartridges is high and a battery pack including the same.

It is a further object of the present invention to provide a battery module configured such that movement of the battery module received in a housing is inhibited and such that a battery pack is easily assembled and a battery pack including the same.

Technical Solution

In order to accomplish the above objects, a battery module according to the present invention includes a plurality of battery cells (700) and a pair of cell cartridges (600) configured to receive the battery cells (700), the pair of cell cartridges being located adjacent to each other, wherein the pair of cell cartridges (600) is identical in external shape and size to each other.

Also, in the battery module according to the present invention, each of the cell cartridges (600) may include a pair of vertical frames (610) opposite each other in a state of being spaced apart from each other by a predetermined distance and a pair of horizontal frames (620) configured respectively to connect upper ends and lower ends of the pair of vertical frames (610) to each other, and each of the vertical frames (610) may be provided with a first coupling member (611) and a second coupling member (612) formed so as to face in one direction in a state of being spaced apart from each other by a predetermined distance, the pair of vertical frames (610) being configured such that the first coupling member (611) and the second coupling member (612) are located in a diagonal direction.

Also, in the battery module according to the present invention, the first coupling member (611) may include a first coupling protrusion (611(a)) protruding by a predetermined length more than the edge of the vertical frame (610) and a first coupling tight-contact recess (611(b)) formed in the outer surface of the first coupling protrusion (611(a)) so as to be depressed by a predetermined depth, and the second coupling member (612) may include a second coupling protrusion (612(a)) seated in the first coupling tight-contact recess (611(b)) in a state of protruding by a predetermined length more than the edge of the vertical frame (610) and a second coupling insertion recess (612(b)) configured to receive the first coupling protrusion (611(a)).

Also, in the battery module according to the present invention, the first coupling protrusion (611(a)) and the second coupling insertion recess (612(b)) may be identical in external shape to each other, and the first coupling tight-contact recess (611(b)) and the second coupling protrusion (612(a)) may be identical in external shape to each other.

Also, in the battery module according to the present invention, a lower one of the pair of horizontal frames (620) may be provided with a third coupling member (621) and a fourth coupling member (622) formed so as to face in one direction in a state of being spaced apart from each other by a predetermined distance, the third coupling member (621) may include a third coupling protrusion (621(a)) protruding by a predetermined length more than the edge of the horizontal frame (620) and a third coupling tight-contact recess (621(b)) formed in the outer surface of the third coupling protrusion (621(a)) so as to be depressed by a predetermined depth, and the fourth coupling member (622) may include a fourth coupling protrusion (622(a)) seated in the third coupling tight-contact recess (621(b)) in a state of protruding by a predetermined length more than the edge of the horizontal frame (620) and a fourth coupling insertion recess (622(b)) configured to receive the third coupling protrusion (621(a)).

Also, the battery module according to the present invention may further include a pair of second fastening members (630) formed in the vicinity of corners at which upper ends of the pair of vertical frames (610) and a corresponding one of the horizontal frames (620) join so as to extend upwards by a predetermined height, wherein each of the second fastening members (630) is provided with a second fastening hole (631) formed in a horizontal direction so as to allow a fastening rod (800) to extend therethrough.

Also, in the battery module according to the present invention, a fifth coupling protrusion (632) may be formed at one side of the second fastening member (630) so as to extend outwards by a predetermined length along the outer diameter of the second fastening hole (631), and a step portion (633) configured to receive the fifth coupling protrusion (632) may be provided at the other side of the second fastening member, the step portion being located outside the second fastening hole (631).

Also, in the battery module according to the present invention, the second fastening member (630) may be further provided with a third fastening hole (634) formed in a vertical direction.

Also, in the battery module according to the present invention, one of the cell cartridges (600) may be configured to receive two battery cells (700).

Also, in the battery module according to the present invention, an end plate (400), a battery cell (700), a cell cartridge (600), a battery cell (700), a battery cell (700), a cell cartridge (600), a battery cell (700), and an end plate (400) may be stacked in order of mention.

Also, in the battery module according to the present invention, an end plate (400), an insulation sheet (500), a battery cell (700), a battery cell (700), a cell cartridge (600), a battery cell (700), a battery cell (700), a cell cartridge (600), a battery cell (700), a battery cell (700), an insulation sheet (500), and an end plate (400) may be stacked in order of mention.

In addition, a battery pack according to the present invention is a battery pack having the battery module received therein, the battery pack including a lower housing (100) and an upper housing (200) coupled to the upper part of the lower housing (100), wherein the upper housing (200) is provided on the inner surface thereof with a fastening protrusion (210) inserted into the third fastening hole (634) of the cell cartridge (600), the fastening protrusion being configured to fix the cell cartridge (600).

In addition, a battery pack according to the present invention has the battery module received therein.

In the present invention, one or more constructions that do not conflict with each other may be selected and combined from among the above constructions.

Advantageous Effects

A battery module according to the present invention has merits in that only cell cartridges of one kind are used, whereby it is possible to reduce cell cartridge manufacturing costs, and in that the cell cartridges can be stacked irrespective of the stacking sequence thereof, whereby it is possible to reduce assembly time.

In addition, the battery module according to the present invention has an advantage in that a plurality of coupling members is provided at the edge of each cell cartridge, whereby it is possible to increase the force of coupling between the cell cartridges.

Furthermore, a battery pack according to the present invention has an advantage in that fastening protrusions formed on the inner surface of an upper housing are fixed to second fastening holes formed in the upper ends of the cell cartridges by interference fitting, whereby it is possible to prevent movement of the battery module and to easily assemble the battery pack.

DESCRIPTION OF DRAWINGS

FIG. 1 is a perspective view showing stacking of conventional cell cartridges.

FIG. 2 is a perspective view of a battery pack according to the present invention.

FIG. 3 is an exploded perspective view of the battery pack according to the present invention.

FIG. 4(a) is a plan view of a lower housing according to the present invention and a battery module received therein, and FIG. 4(b) is a bottom view of an upper housing.

FIG. 5 is a perspective view of a battery module according to the present invention.

FIG. 6 is an exploded perspective view of the battery module according to the present invention.

FIG. 7 is a perspective view of cell cartridges according to the present invention when viewed from one side.

FIG. 8 is a perspective view of the cell cartridges according to the present invention when viewed from the other side.

FIG. 9 is a perspective view of the cell cartridges according to the present invention when viewed from above.

FIG. 10 is an enlarged view showing the upper parts of the cell cartridges according to the present invention.

FIG. 11 is a perspective view of an insulation sheet and an end plate according to the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module configured to be easily assembled according to the present invention and a battery pack including the same will be described with reference to the accompanying drawings.

FIG. 2 is a perspective view of a battery pack according to the present invention, FIG. 3 is an exploded perspective view of a preferred battery pack according to the present invention, FIG. 4(a) is a plan view of a lower housing according to the present invention and a battery module received therein, and FIG. 4(b) is a bottom view of an upper housing.

Referring to FIGS. 2 to 4, the battery pack according to the present invention includes a lower housing 100, an upper housing 200 coupled to the lower housing 100, and an outer terminal 300 protruding outwards through the upper housing 200 in a state of being connected to the lower housing 100 so as to electrically connect the battery pack to an external device.

The lower housing 100 may include one or more battery modules, an ICB assembly, and a BMS assembly. The battery module includes a plurality of battery cells and cell cartridges. The battery module will be described below.

Meanwhile, the ICB assembly serves to electrically connect the one or more battery modules to each other via an ICB busbar provided therein. The BMS assembly is coupled to the upper end of the ICB assembly in order to protect the battery pack. The ICB assembly and the BMS assembly are commonly known constructions, and therefore a more detailed description thereof will be omitted.

As can be seen from FIGS. 3 and 4, the upper housing 200 is coupled to the upper part of the lower housing 100, in which the one or more battery modules, the ICB assembly, and the BMS assembly are received. The lower surface of the upper housing 200, i.e. the inner bottom surface of the upper housing 200, is provided with a plurality of fastening protrusions 210, which is inserted into third fastening holes 643 of the cell cartridges 600 in order to fix the cell cartridges 600.

Specifically, the fastening protrusions 210 and the third fastening holes 643 of the cell cartridges 600 are provided at corresponding positions such that the fastening protrusions 210 are located respectively in the third fastening holes when the upper housing 200 is coupled to the lower housing 100. It is preferable that the fastening protrusions be formed in the same numbers as the third fastening holes 643.

The fastening protrusions 210 provided on the upper housing 200 may be configured to have the same shape or to have different shapes. In the case in which the fastening protrusions 210 have the same shape, it is possible to easily manufacture the fastening protrusions. In the case in which the fastening protrusions 210 have different shapes, it is possible to adjust coupling force of each fastening protrusion 210 based on the position thereof.

Meanwhile, although the fastening protrusions 210 and the third fastening holes 643 may have a protrusion shape and a hole shape, respectively, the fastening protrusions 210 may have a hole shape and the third fastening holes 643 may have a protrusion shape, irrespective of the names thereof.

A battery module according to the present invention received in the lower housing 100 will be described with reference to FIGS. 5 and 6.

FIG. 5 is a perspective view of a battery module according to the present invention, and FIG. 6 is an exploded perspective view of the battery module according to the present invention.

The battery module according to the present invention may include a unit module stack, in which unit modules, each of which includes one or more battery cells 700 and a cell cartridge 600 configured to receive the battery cells 700 therein, are horizontally or vertically stacked on the basis of the ground, a pair of insulation sheets 500 located at the outermost sides of the unit module stack, and a pair of end plates 400 located outside the pair of insulation sheets 500.

Specifically, an end plate 400, an insulation sheet 500, a battery cell 700, a battery cell 700, a cell cartridge 600, a battery cell 700, a battery cell 700, a cell cartridge 600, a battery cell 700, a battery cell 700, an insulation sheet 500, and an end plate 400 may be stacked in the battery module in that order.

Meanwhile, each battery cell 700 may include an electrode assembly, an electrode lead protruding from the electrode assembly, and a case.

The electrode assembly may be a jelly-roll type electrode assembly, which is configured to have a structure in which a long sheet type positive electrode and a long sheet type negative electrode are wound in the state in which a separator is interposed between the positive electrode and the negative electrode, a stacked type electrode assembly including unit cells, each of which is configured to have a structure in which a rectangular positive electrode and a rectangular negative electrode are stacked in the state in which a separator is interposed therebetween, a stacked and folded type electrode assembly, which is configured to have a structure in which unit cells are wound using a long separation film, or a laminated and stacked type electrode assembly, which is configured to have a structure in which unit cells are stacked in the state in which a separator is interposed therebetween and are then attached to each other. However, the present invention is not limited thereto.

The electrode assembly is mounted in the case. The case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and resistance to impact strength, and excellent chemical resistance, is the most preferably used.

The metal layer, which is disposed so as to abut the inner layer, corresponds to a barrier layer configured to prevent moisture or various kinds of gas from permeating into the battery from the outside. Aluminum foil, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

The electrode lead may be configured to have a structure in which the electrode lead is exposed outwards from the case in the state in which electrode tabs of the electrode assembly are electrically connected to the electrode lead or may be configured to have a structure in which the electrode lead directly connects the electrode assembly to the outside of the case in the state in which there are no electrode tabs. However, the present invention is not limited thereto. The battery cells correspond to commonly known constructions, and therefore a more detailed description thereof will be omitted.

A plurality of battery cells 700 may be stacked through the cell cartridges 600. The cell cartridges 600 are shown in FIGS. 7 to 10.

FIG. 7 is a perspective view of cell cartridges according to the present invention when viewed from one side, and FIG. 8 is a perspective view of the cell cartridges according to the present invention when viewed from the other side.

In the battery module according to the present invention, the cell cartridges 600 may have the same external shape and size. That is, each of the cell cartridges 600 according to the present invention may include a pair of vertical frames 610 opposite each other in a state of being spaced apart from each other by a predetermined distance, a pair of horizontal frames 620 configured respectively to connect upper ends and lower ends of the pair of vertical frames 610 to each other, and a pair of second fastening members 630 formed in the vicinity of corners at which the upper ends of the pair of vertical frames 610 and a corresponding one of the horizontal frames 620 join so as to extend upwards by a predetermined height.

First, the vertical frames 610 will be described in more detail. Each vertical frame 610, which has an approximately flat structure, is provided with a first coupling member 611 and a second coupling member 612 formed so as to face in one direction in a state of being spaced apart from each other by a predetermined distance. In the pair of vertical frames 610, the first coupling members 611 and the second coupling members 612 may be located in diagonal directions.

That is, as shown in FIGS. 7 and 8, in the cell cartridges 600 according to the present invention, the first coupling members 611 and the second coupling members 612 are located in diagonal directions such that the same kinds of cell cartridges can be coupled to each other in a state of facing each other.

The first coupling member 611 includes a first coupling protrusion 611(a) protruding by a predetermined length more than the edge of the vertical frame 610 and a first coupling tight-contact recess 611(b) formed in the outer surface of the first coupling protrusion 611(a) so as to be depressed by a predetermined depth. The second coupling member 612 may include a second coupling protrusion 612(a) seated in the first coupling tight-contact recess 611(b) in a state of protruding by a predetermined length more than the edge of the vertical frame 610 and a second coupling insertion recess 612(b) configured to receive the first coupling protrusion 611(a).

Consequently, when a plurality of battery cells 700 is received in an inner space defined by the vertical and horizontal frames 610 and 620 of one cell cartridge 600 and then a pair of cell cartridges 600 is brought into tight contact with each other, the second coupling protrusions 612(a) are seated in the first coupling tight-contact recesses 611(b) and the first coupling protrusions 611(a) are inserted into the second coupling insertion recesses 612(b), whereby a unit module stack capable of inhibiting movement of the cell cartridges 600 upwards, downwards, leftwards, and rightwards may be obtained.

Meanwhile, each of the pair of vertical frames 610 and a lower one of the horizontal frames 620 are provided with a first inner extension portion 613 and a second inner extension portion 623, respectively. When two battery cells 700 are received in a cell cartridge 600, these inner extension portions partition the battery cells 700 from each other.

FIG. 9 is a perspective view of the cell cartridges according to the present invention when viewed from above. In order to increase the force of coupling between the cell cartridges 600, the horizontal frame 620 may be further provided with a third coupling member 621 and a fourth coupling member 622. Specifically, the third coupling member 621 and the fourth coupling member 622 are located at the lower horizontal frame 620. The third coupling member 621 and the fourth coupling member 622 protrude in one direction, more specifically in the same direction as the direction in which the first coupling member 611 and the second coupling member 612 protrude, and are located in a state of being spaced apart from each other by a predetermined distance.

Here, the third coupling member 621 includes a third coupling protrusion 621(a) protruding by a predetermined length more than the edge of the horizontal frame 620 and a third coupling tight-contact recess 621(b) formed in the outer surface of the third coupling protrusion 621(a) so as to be depressed by a predetermined depth. The fourth coupling member 622 may include a fourth coupling protrusion 622(a) seated in the third coupling tight-contact recess 621(b) in a state of protruding by a predetermined length more than the edge of the horizontal frame 620 and a fourth coupling insertion recess 622(b) configured to receive the third coupling protrusion 621(a). These coupling members are identical in external appearance and coupling structure to the first coupling members 611 and the second coupling members 612, and therefore a further description thereof will be omitted.

FIG. 10 is an enlarged view showing the upper parts of the cell cartridges according to the present invention. In each of the cell cartridges 600 according to the present invention, the pair of second fastening members 630 is located in the vicinity of corners at which the upper ends of the pair of vertical frames 610 and the upper horizontal frame 620 join, and protrudes upwards more than the upper horizontal frame 620.

The pair of second fastening members 630 is configured to fix the cell cartridges 600, the battery cells 700, the insulation sheets 500, and the end plates 400 to each other in the state in which the battery cells, the insulation sheets, and the end plates are stacked in front of and at the rear of the cell cartridges.

Specifically, each of the second fastening members 630 may include a second fastening hole 631, a fifth coupling protrusion 632, a step portion 633, and a third fastening hole 634.

The second fastening hole 631 provides a space through which a fastening rod 800 extends, and is formed in a horizontal direction corresponding to the front and the rear of the cell cartridge 600.

The fifth coupling protrusion 632 and the step portion 633 are configured to increase the force of coupling between the pair of cell cartridges 600 when the cell cartridges are brought into tight contact with each other. The fifth coupling protrusion 632 extends outwards by a predetermined length along the outer diameter of the second fastening hole 631, whereas the step portion 633 is formed outside the second fastening hole 631 opposite the side at which the fifth coupling protrusion 632 is formed. Of course, the inner diameter of the step portion 633 is greater than the inner diameter of the second fastening hole 631 so as not to interfere with the fastening rod 800.

Meanwhile, in the pair of second fastening members 630, the fifth coupling protrusion 632 and the step portion 633 are located in opposite directions. That is, in the case in which one of the second fastening members 630 is formed such that the fifth coupling protrusion 632 faces the front and the step portion 633 faces the rear, the fifth coupling protrusion 632 of the other second fastening member 630 faces the rear and the step portion 633 of the other second fastening member faces the front.

When the pair of cell cartridges 600 are brought into tight contact with each other, therefore, the fifth coupling protrusion 632 formed on any one of the cell cartridges 600 is inserted into the second fastening hole 631 of the other cell cartridge 600, which is coupled to the one of the cell cartridges while facing each other.

As described above, the third fastening hole 634 is configured to receive a corresponding one of the fastening protrusions 210 of the upper housing 200 (see FIGS. 4 and 9), and is formed in the upper end of the second fastening member 630, i.e. in the second fastening member 630 in a vertical direction.

Next, the end plate and the insulation sheet will be described. FIG. 11 is a perspective view of an insulation sheet and an end plate according to the present invention.

First, the end plate 400 will be described. The end plate, which is located at each of the outermost sides of the battery module and which has an approximately flat structure, includes a first protuberance 410, a second protuberance 420, a third protuberance 430, a double-sided tape 440, a horizontal bent portion 450, a vertical bent portion 460, and a first fastening member 470.

The first protuberance 410 is provided in the vicinity of each side of the upper edge of the end plate 400, and may minimize movement of the insulation sheet 500 when brought into tight contact therewith.

That is, the first protuberance 410 is configured to have a projection formed at the lower part thereof while protruding in a direction toward the insulation sheet 500.

The second protuberance 420, which is configured to have the shape of a long bar having a predetermined length in the horizontal direction, is located between the pair of first protuberances 410, and is formed so as to rise in the direction toward the insulation sheet 500, in the same manner as the first protuberance 410.

A pair of third protuberances 430 may be formed along the side edge of the end plate 400. For example, each of the third protuberances may be formed in the vicinity of a corner at which the vertical edge and the horizontal edge of the end plate 400 join so as to have an L-shape.

The double-sided tape 440 is located in the vicinity of the second protuberance 420, e.g. above the second protuberance 420, to increase the force of tight contact with the insulation sheet 500.

A plurality of horizontal bent portions 450 and a plurality of vertical bent portions 460 are configured to improve heat dissipation through an increase in surface area and at the same time to prevent deformation of the battery module when impact is applied thereto leftwards, rightwards, upwards, and downwards.

The first fastening member 470 is provided at each side of the upper edge of the end plate, and has a first fastening hole 471, through which the fastening rod 800 extends, formed therein. Here, it is preferable that the first fastening member 470 be formed so as to extend upwards more than the upper edge of the insulation sheet 500.

The insulation sheet 500 is located at the inner surface of each of the pair of end plates 400 and has an approximately flat structure. One surface of the insulation sheet is brought into tight contact with the end plate 400, and the other surface of the insulation sheet abuts the battery cell 700.

Specifically, the insulation sheet 500 includes first receiving portions 510, a second receiving portion 520, and third receiving portions 530. The first receiving portions 510 receive the first protuberances 410 of the end plate 400, the second receiving portion 520 receives the second protuberance 420 of the end plate 400, and the third receiving portions 530 receive the third protuberances 430 of the end plate 400.

When the end plate 400 and the insulation sheet 500 are brought into tight contact with each other, therefore, the side edges of the end plate and the insulation sheet as well as the upper edges of the end plate and the insulation sheet are securely brought into tight contact with each other, whereby the force of coupling therebetween may be increased.

Here, the first receiving portions 510, the second receiving portion 520, and the third receiving portions 530 of the insulation sheet 500 are identical in shape to the first protuberances 410, the second protuberance 420, and the third protuberances 430 of the end plate 400, respectively. These receiving portions correspond to spaces configured to receive the protuberances and thus are in rising states, although the term "receiving portions" is used.

Meanwhile, the battery cell 700 may be seated in a space defined by the first receiving portions 510, the second receiving portion 520, and the third receiving portions 530 of the insulation sheet 500.

That is, three edges of the battery cell 700 may be supported by the pair of third receiving portions 530, each of which is formed so as to have an L-shape, and the other edge of the battery cell may be supported by the pair of the first receiving portions 510 and the second receiving portion 520.

Conventionally, a cell cartridge is needed to mount the battery cell 700. However, the battery module according to the present invention has an advantage in that it is possible to further mount the battery cell 700 through the receiving portions of the insulation sheet 500, whereby it is possible to increase energy density of the battery module.

Meanwhile, the fastening rods 800 extend through the first fastening holes 471 of the end plates 400 and the second fastening holes 631 of the cell cartridges 600 and are then fixed.

The battery pack having the above construction may be applied to various kinds of devices, for example, a vehicle, such as an electric vehicle or a hybrid electric vehicle.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

10: First cartridge
20: Second cartridge
100: Lower housing
200: Upper housing
210: Fastening protrusion
300: Output terminal
400: End plate
410: First protuberance
420: Second protuberance
430: Third protuberance
440: Double-sided tape
450: Horizontal bent portion
460: Vertical bent portion
470: First fastening member 471: First fastening hole
500: Insulation sheet
510: First receiving portion
520: Second receiving portion
530: Third receiving portion
600: Cell cartridge
610: Vertical frame
611: First coupling member
611(*a*): First coupling protrusion 611(*b*): First coupling tight-contact recess
612: Second coupling member
612 (*a*): Second coupling protrusion 612 (*b*): Second coupling insertion recess
613: First inner extension portion
620: Horizontal frame
621: Third coupling member
621(*a*): Third coupling protrusion 621(*b*): Third coupling tight-contact recess
622: Fourth coupling member
622(*a*): Fourth coupling protrusion 622(*b*): Fourth coupling insertion recess
623: Second inner extension portion
630: Second fastening member
631: Second fastening hole 632: Fifth coupling protrusion
633: Step portion 634: Third fastening hole
700: Battery cell
800: Fastening rod

The invention claimed is:

1. A battery module comprising:
a plurality of battery cells; and
a pair of cell cartridges configured to receive the battery cells therein, the pair of cell cartridges being located adjacent to each other, the pair of cell cartridges including a first cell cartridge and a second cell cartridge,
wherein each of the cell cartridges is identical in external shape and size to each other,
wherein each cell cartridge has a first coupling member and a second coupling member extending from a first side of the cell cartridge, and
wherein the first side of the first cell cartridge is coupled to the first side of the second cell cartridge.

2. The battery module according to claim 1, wherein
each of the cell cartridges comprises a pair of vertical frames opposite each other and spaced apart from each other by a predetermined distance and a pair of horizontal frames respectively connecting upper ends and lower ends of the pair of vertical frames to each other, and
each of the vertical frames has the first coupling member and the second coupling member facing in a same direction and spaced apart from each other by a predetermined distance, the first coupling members of the pair of vertical frames of each of the cell cartridges being diagonally opposite from one another, and the second coupling members of the pair of vertical frames of each of the cell cartridges being diagonally opposite from one another.

3. The battery module according to claim 2, wherein
each first coupling member comprises a first coupling protrusion protruding by a predetermined length beyond an edge of the respective vertical frame and a first coupling tight-contact recess extending into an outer surface of the first coupling protrusion so as to be depressed by a predetermined depth relative to the outer surface, and
each second coupling member of each of the cell cartridges comprises a second coupling protrusion seated in the first coupling tight-contact recess of another of the cell cartridges and protruding by a predetermined length beyond the edge of the respective vertical frame and a second coupling insertion recess configured to receive the first coupling protrusion of the another of the cell cartridges seated therein.

4. The battery module according to claim 3, wherein
the first coupling protrusion and the second coupling insertion recess of each vertical frame are identical in external shape to each other, and
the first coupling tight-contact recess and the second coupling protrusion of each vertical frame are identical in external shape to each other.

5. The battery module according to claim 2, wherein
a lower one of the pair of horizontal frames of each cell cartridge has a third coupling member and a fourth coupling member facing in the same direction and spaced apart from each other by a predetermined distance,
the third coupling member having a third coupling protrusion protruding by a predetermined length beyond an edge of the respective horizontal frame and a third coupling tight-contact recess extending into an outer surface of the third coupling protrusion so as to be depressed by a predetermined depth relative to the outer surface, and the fourth coupling member having a fourth coupling protrusion seated in the third coupling tight-contact recess of another of the cell cartridges and protruding by a predetermined length beyond the edge of the respective horizontal frame and a fourth coupling insertion recess configured to receive the third coupling protrusion of the another of the cell cartridges seated therein.

6. The battery module according to claim 2, further comprising:

a pair of second fastening members formed adjacent to corners at which upper ends of the pair of vertical frames of each cell cartridge and a corresponding one of the horizontal frames join, each of the second fastening members extending upwards from a respective one of the corners by a predetermined height, wherein each of the second fastening members has a second fastening hole formed in a horizontal direction so as to allow a fastening rod to extend therethrough.

7. The battery module according to claim 6, wherein a fifth coupling protrusion is formed at one side of each second fastening member so as to extend outwards from a lateral surface of the second fastening member by a predetermined length along an outer diameter of the second fastening hole, and a step portion configured to receive the fifth coupling protrusion of another one of the cell cartridges is provided at another side of each second fastening member, the step portion being located outside of the respective second fastening hole.

8. The battery module according to claim 7, wherein each second fastening member has a third fastening hole extending therethrough in a vertical direction.

9. The battery module according to claim 7, wherein each of the cell cartridges is configured to receive two of the battery cells therein.

10. The battery module according to claim 9, further comprising two end plates stacked with the battery cells and the cell cartridges at opposite ends of the battery module.

11. The battery module according to claim 10, further comprising two insulation sheets stacked with the battery cells and the cell cartridges adjacent to the respective two end plates.

12. A battery pack having the battery module according to claim 8 received therein, the battery pack further comprising:

a lower housing; and an upper housing coupled to an upper part of the lower housing, wherein the upper housing has a fastening protrusion extending from an inner surface thereof inserted into the third fastening hole of one of the cell cartridges, the fastening protrusion being configured to fix a location the cell cartridge relative to the upper housing and the lower housing.

13. A battery pack having the battery module according to claim 1 received therein.

14. The battery module according to claim 1, wherein the first cell cartridge and the second cell cartridge are rotated 180 degrees relative to one another.

15. The battery module according to claim 1, wherein the first coupling member of the first cell cartridge is interlocked with the second coupling member of the second cell cartridge, and the first coupling member of the second cell cartridge is interlocked with the second coupling member of the first cell cartridge.

16. The battery module according to claim 1, wherein the first coupling member and the second coupling member face in a same direction and are spaced apart from each other by a predetermined distance.

* * * * *